(12) United States Patent
Dong

(10) Patent No.: US 10,767,792 B2
(45) Date of Patent: Sep. 8, 2020

(54) SHOCK-ABSORBING FLEXIBLE PIPE

(71) Applicant: Kinrom Industries, Zhejiang (CN)

(72) Inventor: Jingrong Dong, Zhejiang (CN)

(73) Assignee: Kinrom Industries, Zhejiang (CN)

( * ) Notice: Subject to any disclaimer, the term of this patent is extended or adjusted under 35 U.S.C. 154(b) by 37 days.

(21) Appl. No.: 16/308,827

(22) PCT Filed: May 15, 2017

(86) PCT No.: PCT/CN2017/084294
§ 371 (c)(1),
(2) Date: Dec. 11, 2018

(87) PCT Pub. No.: WO2017/215384
PCT Pub. Date: Dec. 21, 2017

(65) Prior Publication Data
US 2019/0309876 A1 Oct. 10, 2019

(30) Foreign Application Priority Data

Jun. 15, 2016 (CN) .......................... 2016 1 0429149

(51) Int. Cl.
*F16L 11/15* (2006.01)
*F16L 11/18* (2006.01)
*F01N 13/08* (2010.01)
*F01N 13/18* (2010.01)

(52) U.S. Cl.
CPC .............. *F16L 11/18* (2013.01); *F01N 13/08* (2013.01); *F01N 13/18* (2013.01); *F16L 11/15* (2013.01); *F01N 13/1838* (2013.01)

(58) Field of Classification Search
CPC .. F16L 51/02; F16L 11/00; F16L 11/15; F16L 27/11
USPC ....... 138/121, 122, 124, 129, 131, 134, 154; 285/226, 47, 223

See application file for complete search history.

(56) References Cited

U.S. PATENT DOCUMENTS

| 5,901,754 A | * | 5/1999 | Elsasser | F01N 13/1816 138/118 |
| 6,230,748 B1 | * | 5/2001 | Krawietz | F01N 13/1816 138/114 |
| 9,970,578 B2 | * | 5/2018 | Barbely | F16L 27/1004 |
| 2003/0024584 A1 | * | 2/2003 | Godel | F01N 13/1816 138/118 |
| 2008/0012297 A1 | * | 1/2008 | Heil | F01N 13/1816 285/226 |

(Continued)

FOREIGN PATENT DOCUMENTS

| CN | 1404562 | 3/2003 |
| CN | 1296650 | 1/2007 |

(Continued)

OTHER PUBLICATIONS

"International Search Report (Form PCT/ISA/210)", dated Aug. 15, 2017, with English translation thereof, pp. 1-4.

*Primary Examiner* — Patrick F Brinson
(74) *Attorney, Agent, or Firm* — JCIP Global Inc.

(57) ABSTRACT

A shock-absorbing flexible pipe includes a corrugated metal pipe and a buckle hose. The buckle hose is sleeved and connected with the corrugated metal pipe. An inner knitted hose is arranged between the buckle hose and the corrugated metal pipe. The inner knitted hose at least partially has a double-layer or multi-layer knitted mesh structure.

19 Claims, 8 Drawing Sheets

(56) References Cited

U.S. PATENT DOCUMENTS

| | | | |
|---|---|---|---|
| 2011/0074147 A1* | 3/2011 | Thomas | F01N 13/143 285/226 |
| 2012/0082807 A1 | 4/2012 | Malloy et al. | |
| 2015/0204470 A1* | 7/2015 | Kim | F16L 27/111 285/226 |
| 2016/0069059 A1* | 3/2016 | Webel | F16L 51/03 4/421 |

FOREIGN PATENT DOCUMENTS

| | | |
|---|---|---|
| CN | 104471301 | 3/2015 |
| CN | 105605342 | 5/2016 |
| CN | 105840927 | 8/2016 |
| CN | 106014582 | 10/2016 |
| CN | 205805672 | 12/2016 |

\* cited by examiner

SHOCK-ABSORBING FLEXIBLE PIPE

CROSS-REFERENCE TO RELATED APPLICATION

This is a 371 application of the International PCT application serial no. PCT/CN2017/084294, filed on May 15, 2017, which claims the priority benefits of China Application No. 201610429149.0, filed on Jun. 15, 2016. The entirety of each of the above-mentioned patent applications is hereby incorporated by reference herein and made a part of this specification.

BACKGROUND

Technical Field

The present invention relates to the technical field of automobile parts, and more particularly relates to a shock-absorbing flexible pipe used in an automobile exhaust system.

Description of Related Art

In order to reduce vibration and abnormal noise generated when an automobile is exhausting, technicians often add a flexible pipe to an automobile exhaust system during design. Generally, the flexible pipe is composed of a corrugated pipe, a metal mesh sleeve covering outside, and an end cap. In order to reduce thermal shock of high-temperature exhaust gas and noise caused by airflow impact, it is often necessary to add a buckle hose inside the corrugated pipe. However, in practical applications, the buckle hose easily collides with the corrugated pipe to produce the abnormal noise. In practical applications, due to unreasonable structure, a shock-absorbing effect of the flexible pipe is not ideal, and it is easy to fail during use, resulting in the abnormal noise and louder noise. Meanwhile, many of the flexible pipes consume a large amount of materials, and have a problem of higher cost. However, a structure of a general exhaust system or flexible pipe in the prior art has not effectively solved the above problems. For example, Chinese Grant Publication No. CN 1296650 C, granted on Jan. 24, 2007, and is titled "Flexible Pipe Fitting" discloses a structure of a flexible pipe. Through innovative combination of a corrugated metal pipe, a woven hose, a buckle hose, spacers and the like, a premature failure of the corrugated metal pipe is avoided; however, the spacers of this patent is inconvenient to install and an installation position is difficult to maintain, and once it slides, it cannot play a buffering role. Meanwhile, the woven hose is still made of a woven mesh in a plane structure, lacking the necessary elasticity and having problem of non-ideal shock-absorbing effect. Another example is the Chinese Patent Application Publication No. CN 104471301 A having the publication date of Mar. 25, 2015 and titled "Flexible Pipe Device". This patent discloses a structure of a flexible pipe, which implements a characteristic of vibration buffering of a corrugated metal pipe component through the innovative combination of the corrugated metal pipe component, a knitted component, and an elastic component. However, the elastic component of this patent is arranged on an external surface of the corrugated metal pipe component, a material consumption is large, and thus, there is a problem of high cost. Besides, during running process of the automobile, the exhaust system vibrates greatly, an impact on an inside of the corrugated metal pipe component is large, and the noise is high, so there are still the problems of risk of the abnormal noise and the non-ideal shock-absorbing effect. Through the innovative combination of the corrugated metal pipe, the buckle hose, and the inner knitted hose, the present invention provides a shock-absorbing flexible pipe, which has characteristics of simple structure, reliable performance, material saving, low cost, good shock-absorbing effect and thermal-insulation effect, long service life and various types, and is applicable to various working conditions of automobiles.

SUMMARY

The present invention solves the problem that the structure of the general flexible pipe in the prior art does not effectively solve the problems of high cost and non-ideal shock-absorbing effect, and provides a shock-absorbing flexible pipe. Through the innovative combination of a corrugated metal pipe, a buckle hose, and an inner knitted hose, the shock-absorbing flexible pipe has characteristics of simple structure, reliable performance, material saving, good shock-absorbing effect and thermal-insulation effect and long service life, and is applicable to various working conditions of automobiles.

In order to solve the above-mentioned technical problems, the present invention adopts following technical scheme. The shock-absorbing flexible pipe includes a corrugated metal pipe and a buckle hose. The buckle hose is sleeved and connected with the corrugated metal pipe. An inner knitted hose is arranged between the buckle hose and the corrugated metal pipe, and the inner knitted hose at least partially has a double-layer or multi-layer knitted mesh structure.

During assembling, the inner knitted hose is sleeved outside the buckle hose being retractable, then the corrugated metal pipe is sleeved outside the inner knitted hose, and then both ends of the shock-absorbing flexible pipe are aligned and then fixed after being compacted, thereby completing the assembly.

The corrugated metal pipe is a main body of the shock-absorbing flexible pipe, has good flexibility and bending performance, and has effects of effectively reducing vibration transmission and buffering vibrations. During exhausting process, automobile exhaust has a very high temperature, and the buckle hose is used to protect the corrugated metal pipe and prevent the corrugated metal pipe from failing due to an impact of high-temperature exhaust gas, thereby prolonging service life of the corrugated metal pipe and also reducing the noise formed by airflow impact. The buckle hose is a retractable structure for compensating for a displacement during vibration and limiting a displacement range. The inner knitted hose is, technically, made of a high-temperature-resistant single metal wire or a plurality of metal wire strands by a knitting technique to form a layered three-dimensional mesh structure with good elasticity. When the exhaust system is working, the inner knitted hose is used to buffer or inhibit vibration of the buckle hose and compensate or offset the displacement caused by the vibration, thereby greatly buffering or inhibiting the vibration of the corrugated metal pipe, prolonging the service life of the corrugated metal pipe, reducing the vibration transmission between the two ends of the shock-absorbing flexible pipe, greatly reducing the noise and vibration of the automobile exhaust system, and improving the HVN performance of the automobile. As for the inner knitted hose at least partially having the double-layer or multi-layer knitted mesh structure, firstly, the vibration and abnormal noise of the shock-absorbing flexible pipe are mainly caused by the vibration of the buckle hose, and the inner knitted hose effectively buffers or inhibits the vibration of the buckle hose, greatly improves the shock-absorbing effect, also effectively prevents rigid collision between the buckle hose and the corrugated metal pipe, and further reduces the abnormal noise, so that performances of the shock-absorbing flexible pipe are more reliable. Secondly, a space between the corrugated metal pipe and the buckle hose is increased to have a better thermal-insulation effect as compared with the single-layer knitted hose. Thirdly, compared with a case that the knitted mesh is arranged outside the corrugated metal pipe, a consumption of the metal wire is greatly reduced, and the cost is lowered.

Preferably, the inner knitted hose is composed of a double-layer knitted mesh. When the automobile accelerates, via analysis of computer software, the inner knitted hose of the double-layer knitted mesh structure can effectively ensure the shock-absorbing effect of the automobile exhaust system and have the effect of reducing the abnormal noise.

Preferably, the double-layer knitted mesh is made of a complete knitted hose, wherein a part of the complete knitted hose forms an outer knitted mesh by a folding technique, and another part of the complete knitted hose forms an inner knitted mesh. This structure enables the inner knitted hose of the double-layer structure to be realized by folding the single-layer knitted mesh, thereby simplifying manufacturing procedure of the inner knitted hose, improving production efficiency and lowering the cost. The complete double-layer-structure knitted hose further improves the shock-absorbing effect of the shock-absorbing flexible pipe and reduces risk of breakage of the knitted mesh, thereby reducing risk of the abnormal noise caused by the breakage failure of the knitted mesh.

Preferably, the inner knitted hose is composed of a multi-layer knitted mesh. During start, gear shifting, or acceleration of the automobile, via the analysis of computer software, the inner knitted hose of the multi-layer knitted mesh structure can effectively ensure the shock-absorbing effect of the automobile exhaust system and have the effect of reducing the abnormal noise.

Preferably, the multi-layer knitted mesh is made of a complete knitted hose, and the complete knitted hose is folded over many times to form a multi-layer structure. This structure simplifies the manufacturing procedure of the inner knitted hose, improves production efficiency, and lowers the cost.

Preferably, two adjacent layers of knitted mesh of the inner knitted hose are connected by a knitting technique or a sewing technique. This structure enables each layer of knitted mesh of the inner knitted hose to have reliable connection and stable performance.

Preferably, an outside of the inner knitted hose is provided with a partial knitted band. The partial knitted band refers to a partial thickening layer outside the inner knitted hose, which is directly fixed to the outside of the inner knitted hose by a knitting or sewing technique, and compared with the patent CN 1296650 C, the position is relatively fixed, and the mounting of the partial knitted band is not needed. The partial knitted band and the inner knitted hose being single-layer-structural are combined, but consumption of raw material is reduced, and a shock-absorbing resistance between the corrugated metal pipe and the buckle hose is increased. Compared with the complete double-layer inner mesh structure, this structure has the same shock-absorbing effect, but reduces a friction between each other, has a better thermal-insulation effect, and lowers the temperature of the corrugated metal pipe, thereby prolonging a fatigue life of the corrugated metal pipe, and meeting a technical requirement during car acceleration, deceleration or shifting via the analysis of computer software.

Preferably, the knitted band is an annular, straight-strip or spiral structure. By combining the knitted band of the straight-strip or spiral structure with a structure of the single-layer inner knitted hose, when the automobile is running fast or accelerating, through the analysis of computer software, the inner knitted hose with the knitted band can effectively ensure the shock-absorbing effect of the automobile exhaust system and effectively reduce the risk of the abnormal noise.

Preferably, a wall thickness of at least a part of the inner knitted hose is 0.6 mm to 1.0 mm. In the inner knitted hose of the double-layer or partial double-layer knitted mesh structure, via the analysis of computer software, the inner knitted hose within a wall thickness range can be applicable to the technical requirements of a general automobile during running process under most working conditions.

Preferably, a wall thickness of at least a part of the inner knitted hose is 1.0 mm to 1.5 mm. In the inner knitted hose of the double-layer, partial double-layer, or multi-layer knitted mesh structure, via the analysis of computer software, the inner knitted hose within a wall thickness range can be applicable to the technical requirements of the automobile during the running process under fast running, accelerating, or shifting.

Preferably, a wall thickness of at least a part of the inner knitted hose is greater than 1.5 mm. In the inner knit hose of the double-layer, partial double-layer or multi-layer knitted mesh structure, via the analysis of computer software, the inner knitted hose within a wall thickness range can meet the technical requirements of the automobile during the running process under very harsh working conditions, and has a better shock-absorbing effect.

Preferably, a minimum clearance between at least a part of the inner knitted hose and the corrugated metal pipe is less than 1.0 mm. This structure ensures that the inner knitted hose and the corrugated metal pipe have a close contact with the buckle hose, thereby effectively reducing the vibration of the corrugated metal pipe and the buckle hose.

Preferably, the inner knitted hose at least partially forms an interference fit structure with the corrugated metal pipe. This structure ensures a mutual sufficient contact between an inner wall of the corrugated metal pipe and an outer wall of the inner knitted hose, and between an outer wall of the buckle hose and an inner wall of the inner knitted hose, thereby effectively reducing the vibration between the corrugated metal pipe and the buckle hose and having a better shock-absorbing effect.

Preferably, one end of the inner knitted hose is fixed to an end portion of the shock-absorbing flexible pipe, and the other end of the inner knitted hose is a free end. This structure greatly improves flexibility and elasticity of the inner knitted hose, further improves the shock-absorbing effect of the shock-absorbing flexible pipe, reduces the abnormal noise, and also reduces the risk of breakage failure of the inner knitted hose.

Preferably, both ends of the inner knitted hose are respectively fixed to both ends of the shock-absorbing flexible pipe. This structure has characteristics of reliable connection and stable performance.

Preferably, an outside of the corrugated metal pipe is provided with an outer knitted mesh. The outer knitted mesh is used to effectively reduce the vibration of the corrugated metal pipe, and during mounting, the outer knitted mesh and the corrugated metal pipe can be welded and fixed by an end cap.

Preferably, an outside of the corrugated metal pipe is provided with an outer woven mesh. The outer woven mesh is used to protect the corrugated metal pipe and prevent a foreign matter from impacting the corrugated metal pipe, and during mounting, the outer woven mesh and the corrugated metal pipe can be welded and fixed by the end cap.

Preferably, an outer circumference of end portions at two sides of the corrugated metal pipe is integrally and convexly provided with a welding positioning ring. The welding positioning ring has a U-shaped cross section, and comprises an arc-shaped structure and two side edges that are integrally connected with two end portions of the arc-shaped structure. Since the welding positioning ring is integrally formed on the outer circumference of the two end portions of the corrugated metal pipe, when the flexible pipe is welded with an exhaust pipe, a positioning block is used to fix the flexible pipe by clamping the welding positioning ring, so that when the flexible pipe is welded with the exhaust pipe, a position of the flexible pipe is fixed, and no crack at the weld will occur due to sloshing, thereby obviously improving the welding quality, increasing a pass rate of the product and lowering a production cost. On the other hand, the welding positioning ring of the present invention is directly formed on the corrugated metal pipe, and the welding positioning ring has a fixed position and good uniformity, thereby reducing the welding procedure, and improving the welding precision and quality.

Preferably, the two side edges of the welding positioning ring are attached to each other. The welding positioning ring is disposed at a middle portion of a connecting section. This is a structure in which the two side edges of the welding positioning ring of the foregoing scheme are pressed and attached to each other, so that a structural strength of the flexible pipe welding positioning ring is increased.

Due to the above technical scheme, the shock-absorbing flexible pipe provided by the present invention has following beneficial effects. Through the innovative combination of the corrugated metal pipe, the buckle hose, and the inner knitted hose, the present invention provides the shock-absorbing flexible pipe, which has the characteristics of simple structure, reliable performance, material saving, low cost, good shock-absorbing effect and thermal-insulation effect, long service life and various types, and is applicable to various working conditions of automobiles. In particular, the shock-absorbing flexible pipe adopting the above technical scheme can have the same vibration inhibiting effect on the corrugated metal pipe part as other flexible pipes having an outer knitted mesh under the condition that there is no outer knitted mesh, so it is possible to omit the outer knitted mesh or the outer woven mesh which usually has to be mounted, thereby greatly lowering the production cost and the raw material cost.

DESCRIPTION OF THE EMBODIMENTS

The present invention is further described in detail with reference to the accompanying drawings.

Figure 1:
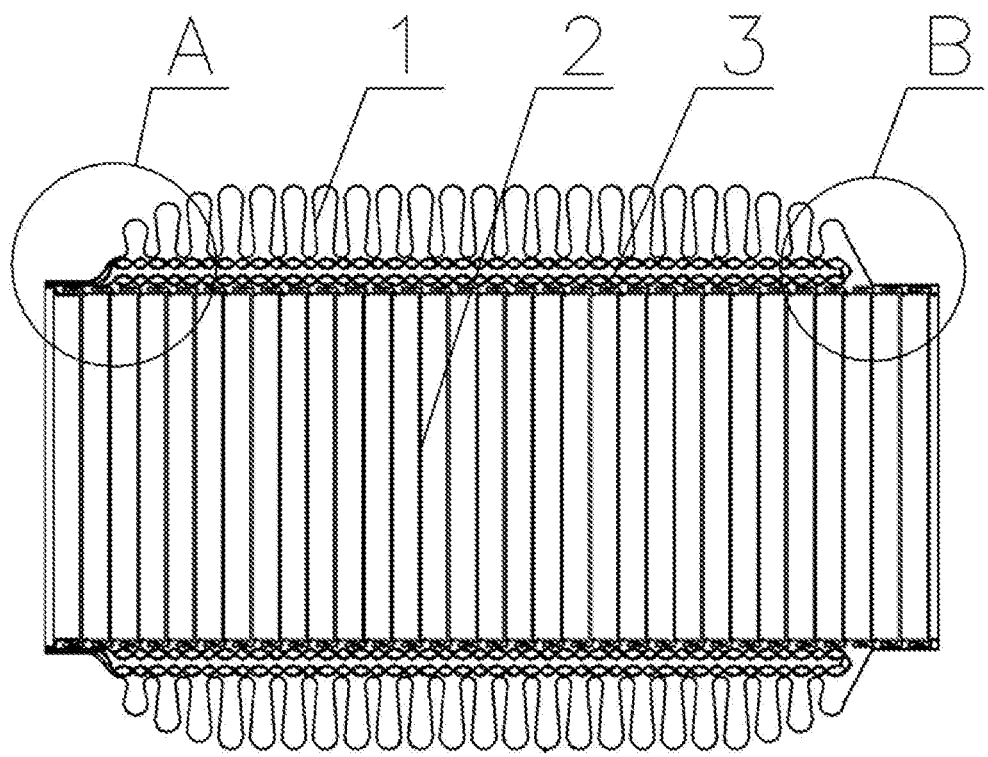
FIG. 1 is a first structural schematic view of the present invention.
Figure 2:
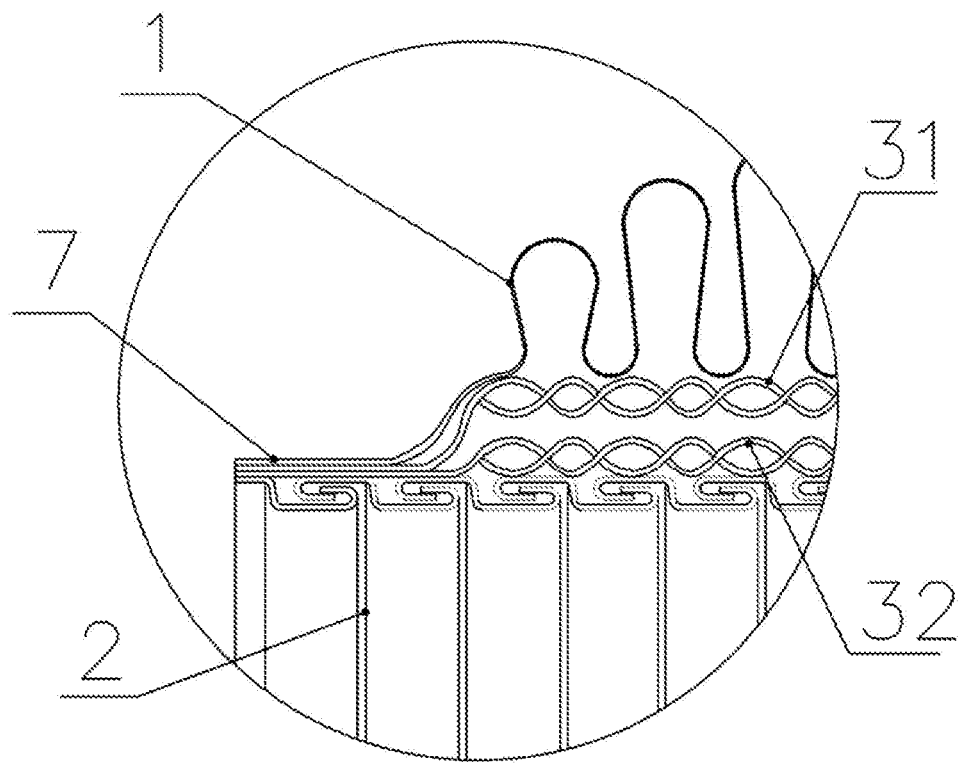
FIG. 2 is an A-direction enlarged view of FIG. 1 of the present invention.
Figure 3:
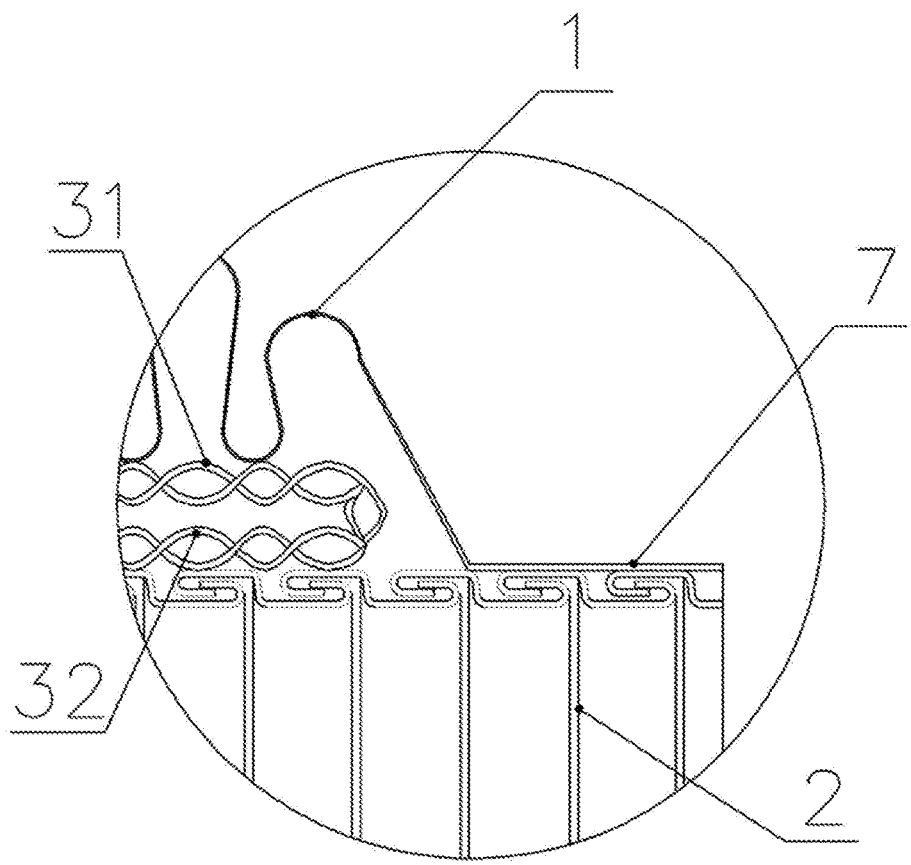
FIG. 3 is a B-direction enlarged view of FIG. 1 of the present invention.
Figure 16:
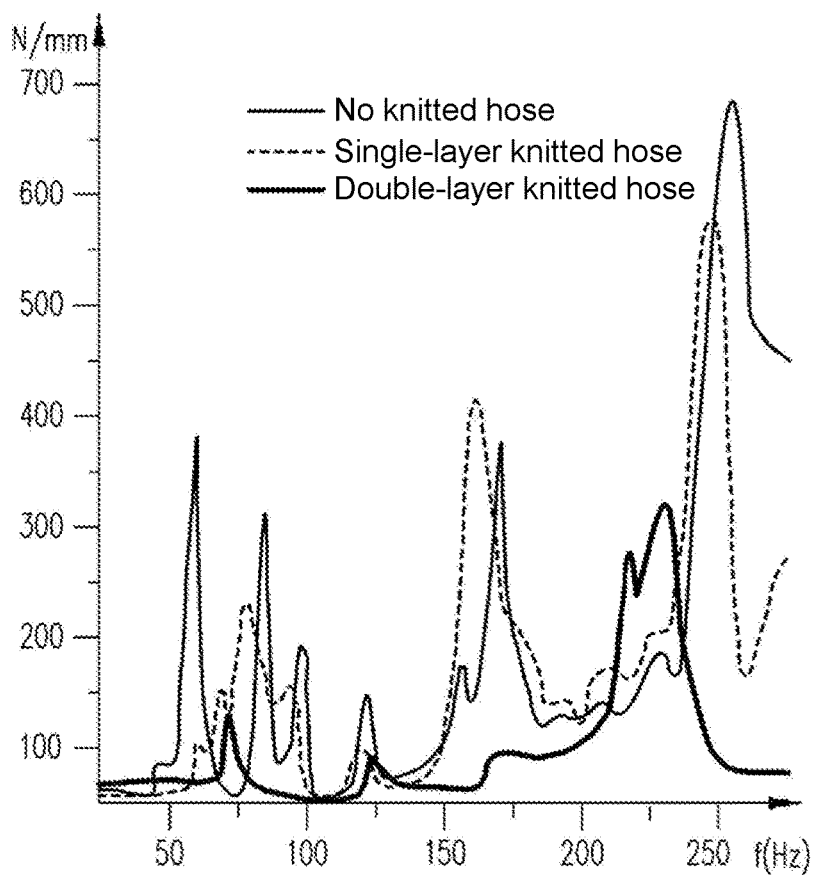
FIG. 16 is an analysis chart of a stress per unit length and a vibration frequency of a shock-absorbing flexible pipe under different conditions.

Embodiment 1: Referring to FIG. 1, FIG. 2 and FIG. 3, a shock-absorbing flexible pipe comprises a corrugated metal pipe 1 and a buckle hose 2. The buckle hose 2 is sleeved and connected with the corrugated metal pipe 1. An inner knitted hose 3 is arranged between the buckle hose 2 and the corrugated metal pipe 1. The inner knitted hose 3 is composed of a double-layer knitted mesh, and the inner knitted hose 3 forms an interference fit structure with the corrugated metal pipe 1. A wall thickness of the inner knitted hose 3 is 1.0 mm. The double-layer knitted mesh is made of a complete knitted hose, wherein a part of the complete knitted hose forms an outer knitted mesh 31 by a folding technique, and another part of the complete knitted hose forms an inner knitted mesh 32. One end of the inner knitted hose 3 is fixed to an end portion 7 of the shock-absorbing flexible pipe, and the other end of the inner knitted hose 3 is a free end. The knitted hose of this embodiment is made of a single stainless steel wire by a knitting technique. Through the comparison of a double-layer inner knitted hose, a single-layer inner knitted hose and a no inner knitted hose structure (see FIG. 16), it is apparent that the shock-absorbing flexible pipe of the present invention has an obvious effect in buffering or inhibiting vibration of the corrugated metal pipe.

Figure 4:
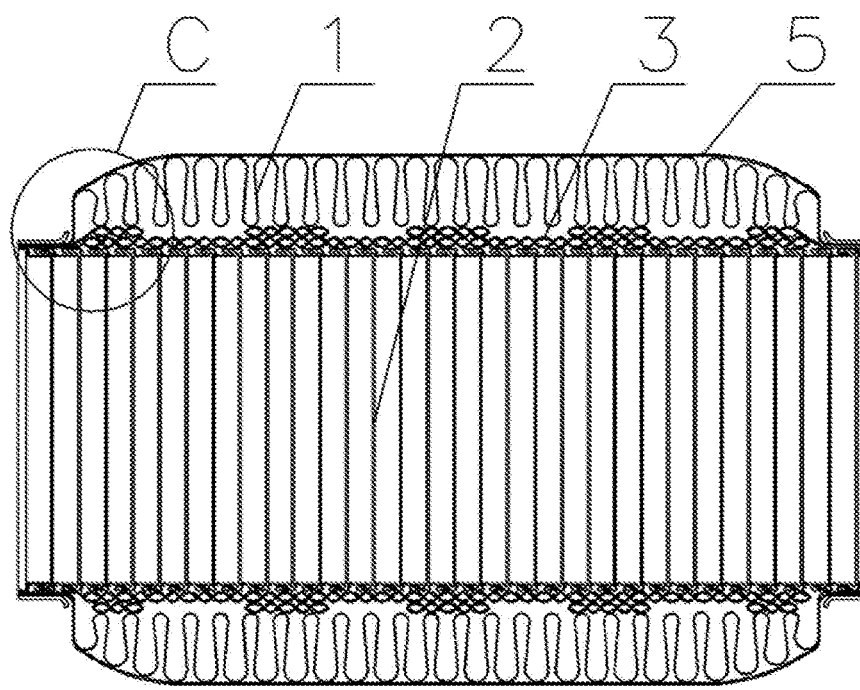
FIG. 4 is a second structural schematic view of the present invention.
Figure 5:
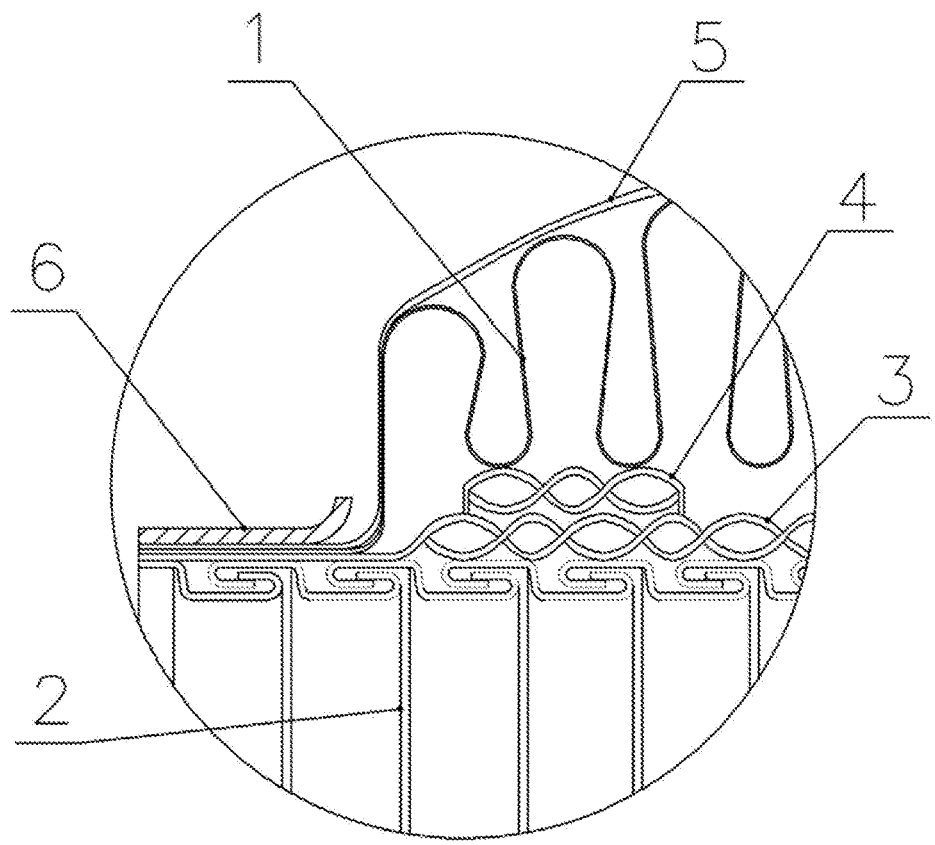
FIG. 5 is a C-direction enlarged view of FIG. 4 of the present invention.

Embodiment 2: Referring to FIG. 4 and FIG. 5, a shock-absorbing flexible pipe comprises a corrugated metal pipe 1 and a buckle hose 2. The buckle hose 2 is sleeved and connected with the corrugated metal pipe 1. An inner knitted hose 3 is arranged between the buckle hose 2 and the corrugated metal pipe 1, and an outside of the inner knitted hose 3 is provided with a partial knitted band 4. The knitted band 4 is an annular structure. A total thickness of the inner knitted hose 3 and the knitted band 4 is 0.9 mm. A minimum clearance between the knitted band 4 and the corrugated metal pipe 1 is less than 1.0 mm. Both ends of the inner knitted hose 3 are respectively fixed to both ends of the shock-absorbing flexible pipe. The knitted hose of this embodiment is made of a plurality of stainless steel wire strands by a knitting technique, and an outside of the corrugated metal pipe 1 is provided with an outer woven mesh 5.

Figure 6:
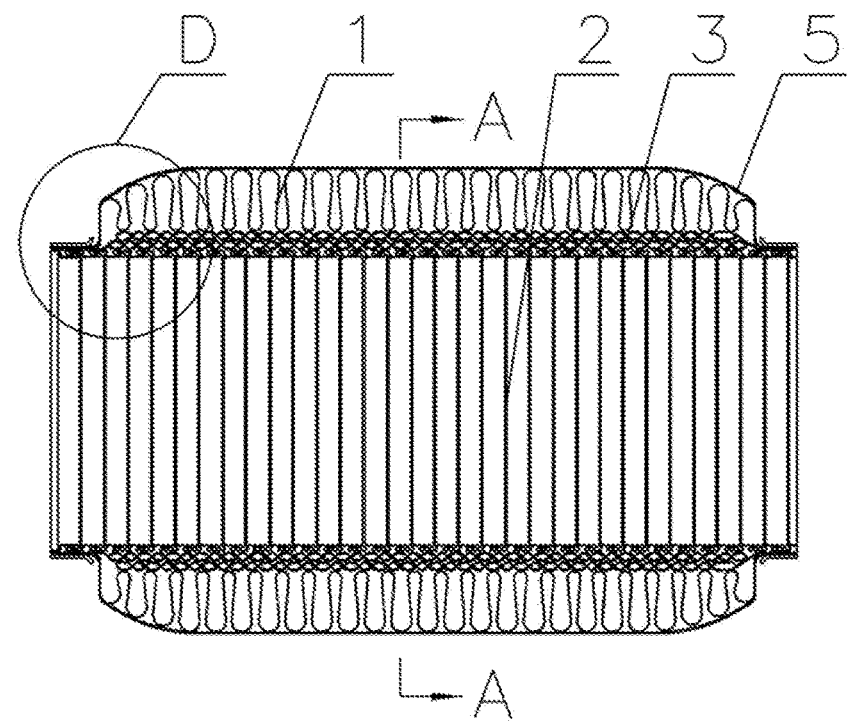
FIG. 6 is a third structural schematic view of the present invention.
Figure 7:
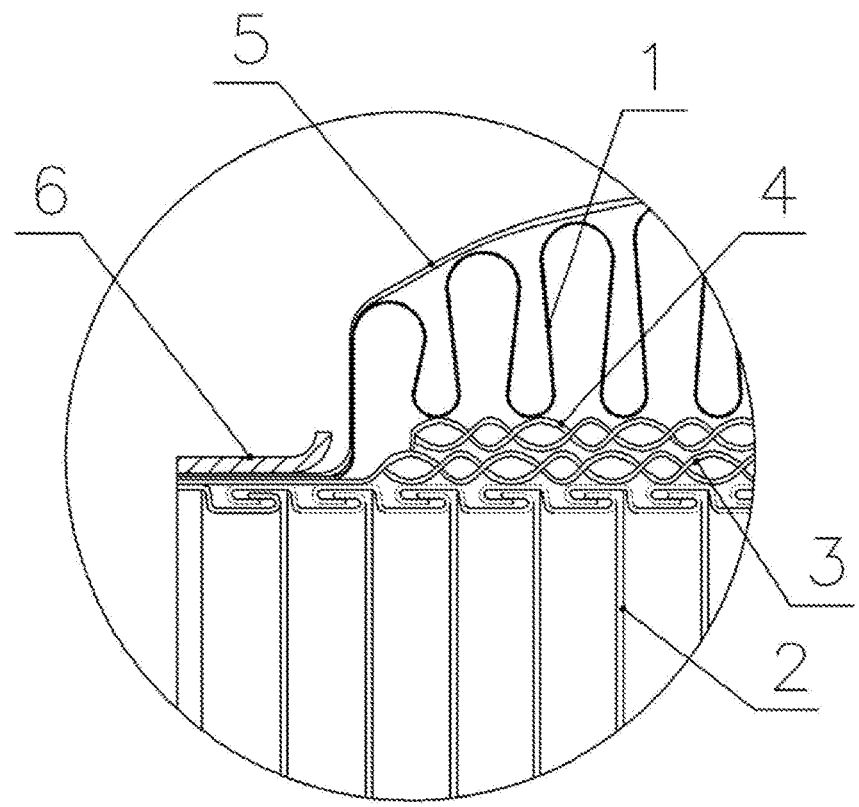
FIG. 7 is a D-direction enlarged view of FIG. 6 of the present invention.
Figure 8:
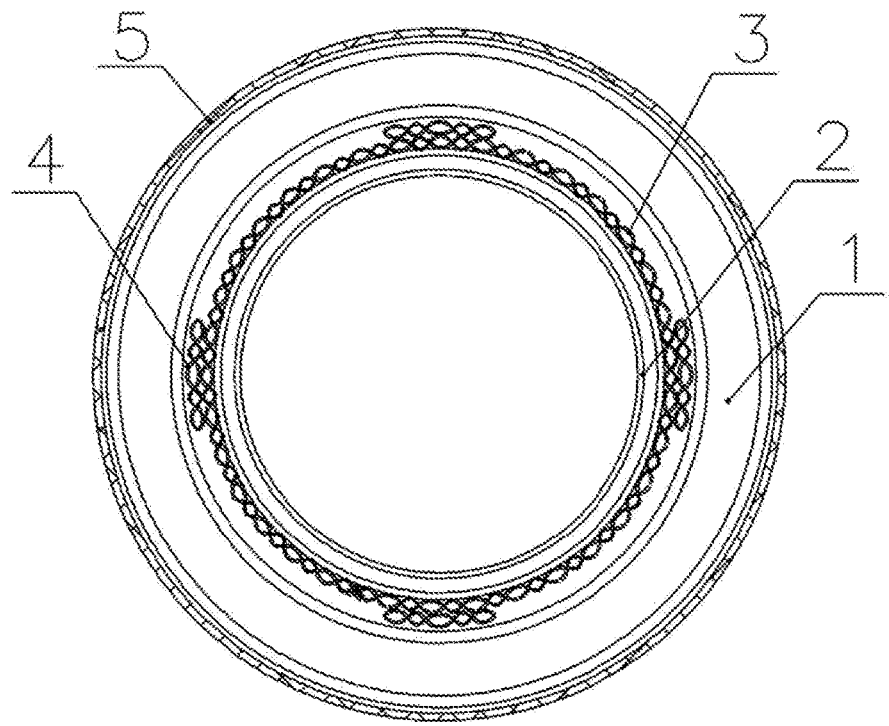
FIG. 8 is a first cross-sectional view of FIG. 6 of the present invention in an A-A direction.

Embodiment 3: Referring to FIG. 6, FIG. 7 and FIG. 8, a shock-absorbing flexible pipe comprises a corrugated metal pipe 1 and a buckle hose 2. The buckle hose 2 is sleeved and connected with the corrugated metal pipe 1. An inner knitted hose 3 is arranged between the buckle hose 2 and the corrugated metal pipe 1, and an outside of the inner knitted hose 3 is provided with a partial knitted band 4. The knitted band 4 is of a straight-strip structure, and the knitted band 4 is arranged in an axial direction of the inner knitted hose 3. A total thickness of the inner knitted hose 3 and the knitted band 4 is 0.8 mm. A minimum clearance between the knitted band 4 and the corrugated metal pipe 1 is 0.5 mm. Both ends of the inner knitted hose 3 are respectively fixed to both ends of the shock-absorbing flexible pipe. An outside of the corrugated metal pipe 1 is provided with an outer woven mesh 5, and both ends of the shock-absorbing flexible pipe are fixed through an end cap 6.

Figure 9:
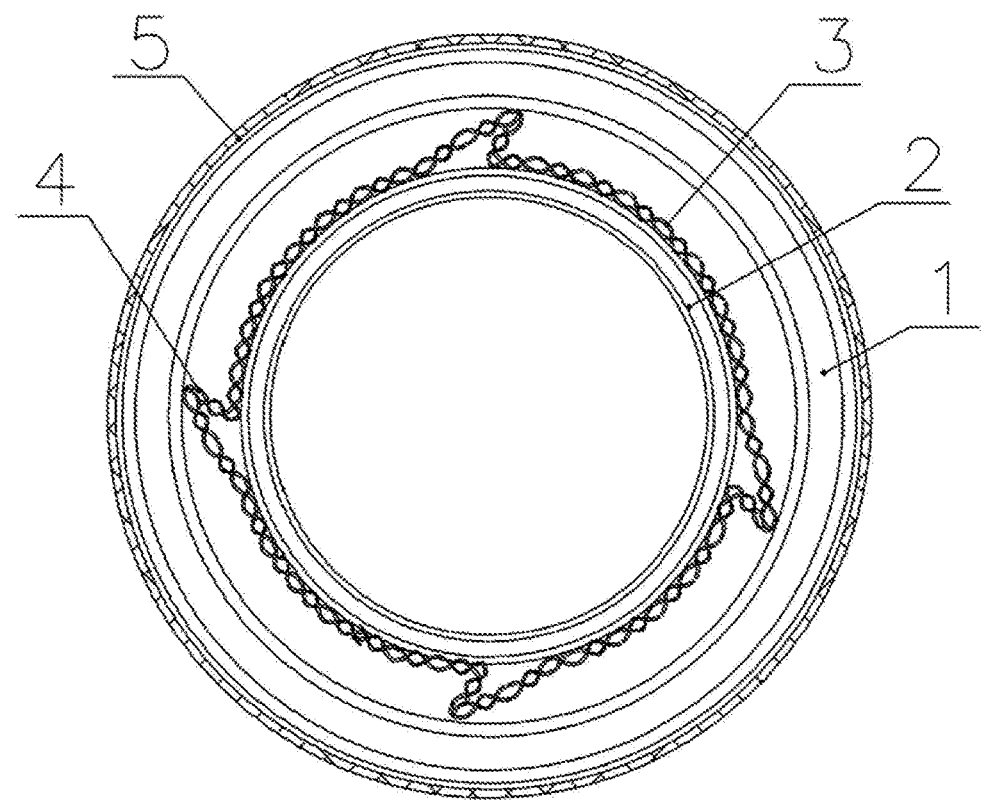
FIG. 9 is a second cross-sectional view of FIG. 6 of the present invention in the A-A direction.

Embodiment 4: Referring to FIG. 6, FIG. 7 and FIG. 9, a shock-absorbing flexible pipe comprises a corrugated metal pipe 1 and a buckle hose 2. The buckle hose 2 is sleeved and connected with the corrugated metal pipe 1. An inner knitted hose 3 is arranged between the buckle hose 2 and the corrugated metal pipe 1. An outside of the inner knitted hose 3 is provided with a partial knitted band 4. The knitted band 4 is of a straight-strip structure, and the knitted band 4 is arranged along an axial direction of the inner knitted hose 3. The knitted band 4 being straight-strip is formed by axial pleats of the inner knitted hose 3. A total thickness of the inner knitted hose 3 and the knitted band 4 is 1.2 mm. A minimum clearance between the knitted band 4 and the corrugated metal pipe 1 is 0.5 mm. Both ends of the inner knitted hose 3 are respectively fixed to both ends of the shock-absorbing flexible pipe. An outside of the corrugated metal pipe 1 is provided with an outer woven mesh 5, and both ends of the shock-absorbing flexible pipe are fixed through an end cap 6.

Figure 10:
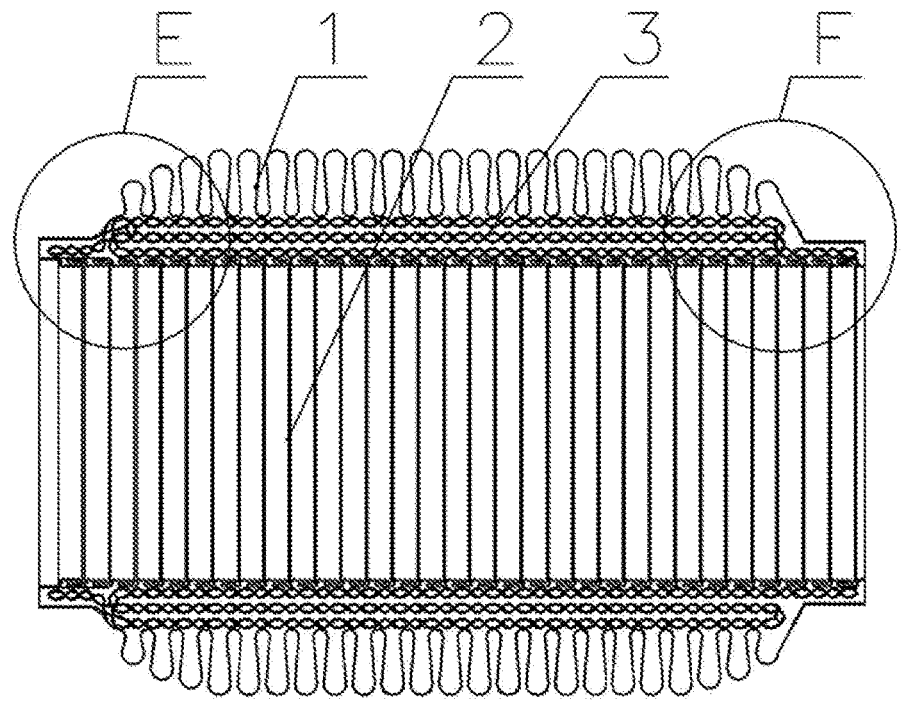
FIG. 10 is a fourth structural schematic view of the present invention.
Figure 11:
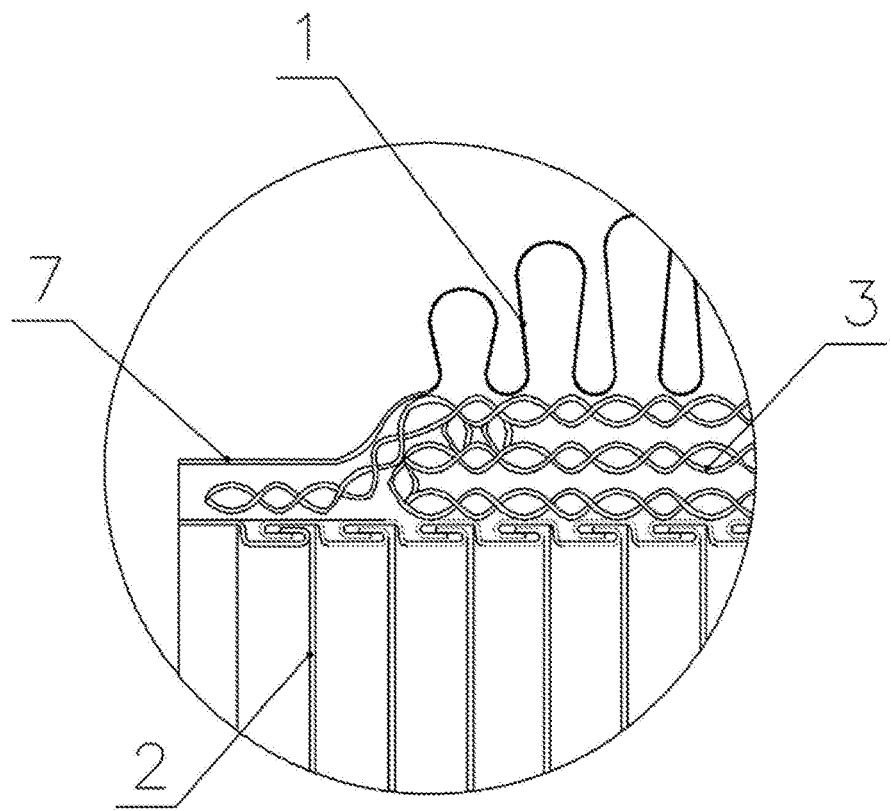
FIG. 11 is an E-direction enlarged view of FIG. 10 of the present invention.
Figure 12:
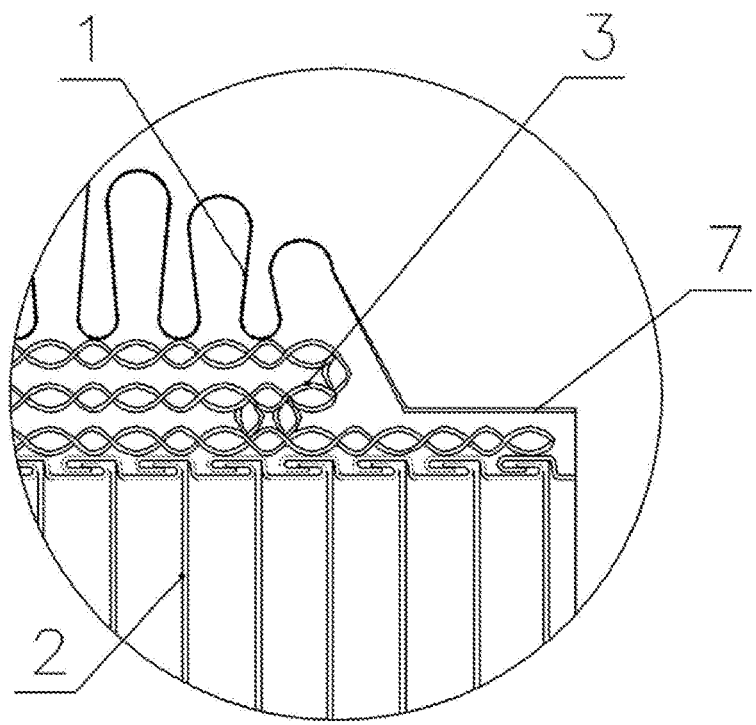
FIG. 12 is an F-direction enlarged view of FIG. 10 of the present invention.

Embodiment 5: Referring to FIG. 10, FIG. 11 and FIG. 12, a shock-absorbing flexible pipe comprises a corrugated metal pipe 1 and a buckle hose 2. The buckle hose 2 is sleeved and connected with the corrugated metal pipe 1. An inner knitted hose 3 is arranged between the buckle hose 2 and the corrugated metal pipe 1, and the inner knitted hose 3 forms an interference fit structure with the corrugated metal pipe 1. The inner knitted hose 3 is composed of a three-layer knitted mesh. A wall thickness of the inner knitted hose 3 is 1.8 mm. The three-layer knitted mesh is made of a complete knitted hose, and the complete knitted hose is folded three times to form a three-layer structure. Both ends of two adjacent layers of knitted mesh are connected by a knitting technique or a sewing technique, and both ends of the inner knitted hose 3 are respectively fixed to both ends of the shock-absorbing flexible pipe.

An outside of the corrugated metal pipe of an Embodiment 6 is provided with an outer knitted mesh, and the outer knitted mesh is arranged on an outermost layer of the shock-absorbing flexible pipe. For the shock-absorbing flexible pipe provided with an outer woven mesh, the outer knitted mesh is arranged between the corrugated metal pipe and the outer woven mesh, and the remainders are the same as in the foregoing embodiment.

Figure 13:
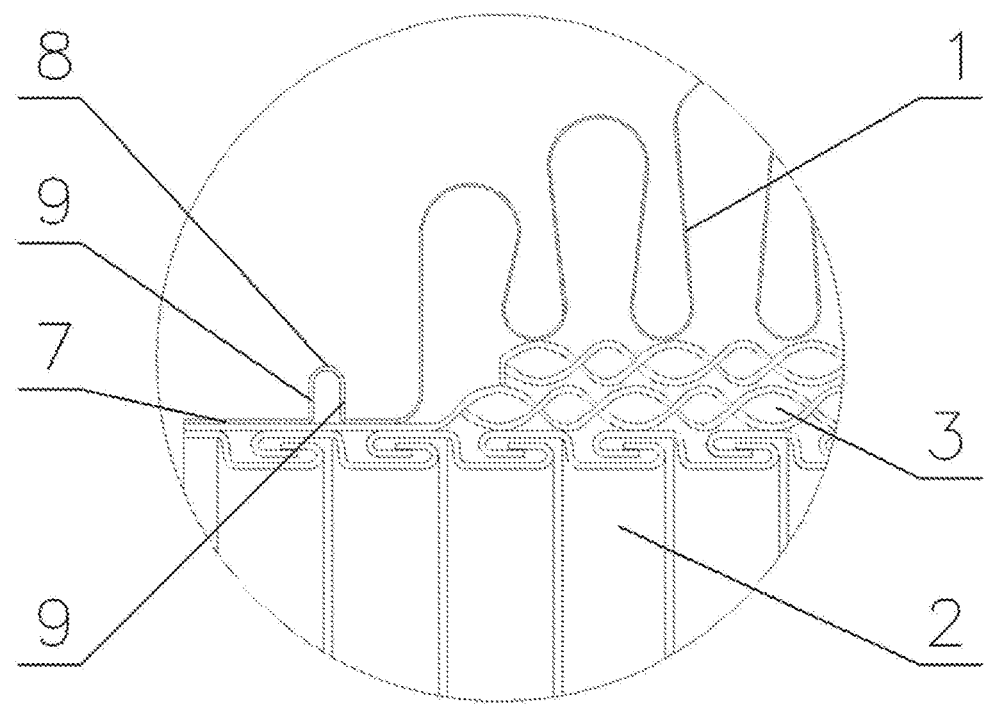
FIG. 13 is a partial structural schematic view of the present invention.

Embodiment 7: Referring to FIG. 13, an outer circumference of end portions 7 at two sides of the corrugated metal pipe 1 is integrally and convexly provided with a welding positioning ring 8. The welding positioning ring has a U-shaped cross section, and comprises an arc-shaped structure and two side edges 9 that are integrally connected with two end portions of the arc-shaped structure, and that are parallel to each other.

Figure 14:
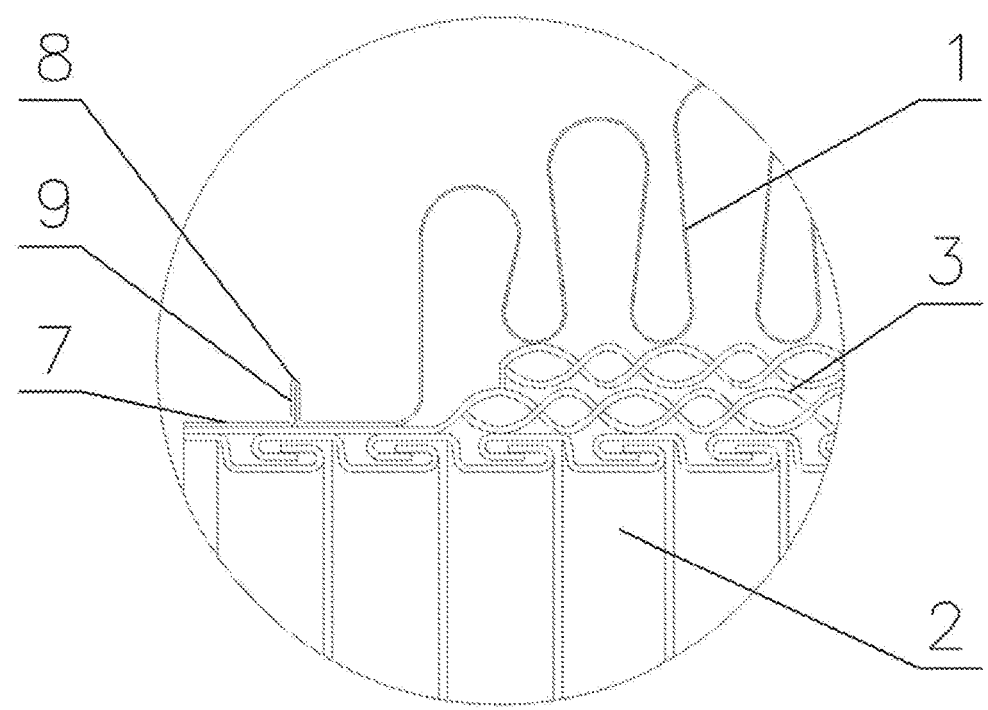
FIG. 14 is another partial structural schematic view of the present invention.

Embodiment 8: Two side edges of the welding positioning ring are attached to each other. The welding positioning ring is arranged on a middle portion of a connecting section (see FIG. 14), and the remainders are the same as in Embodiment 7.

Figure 15:
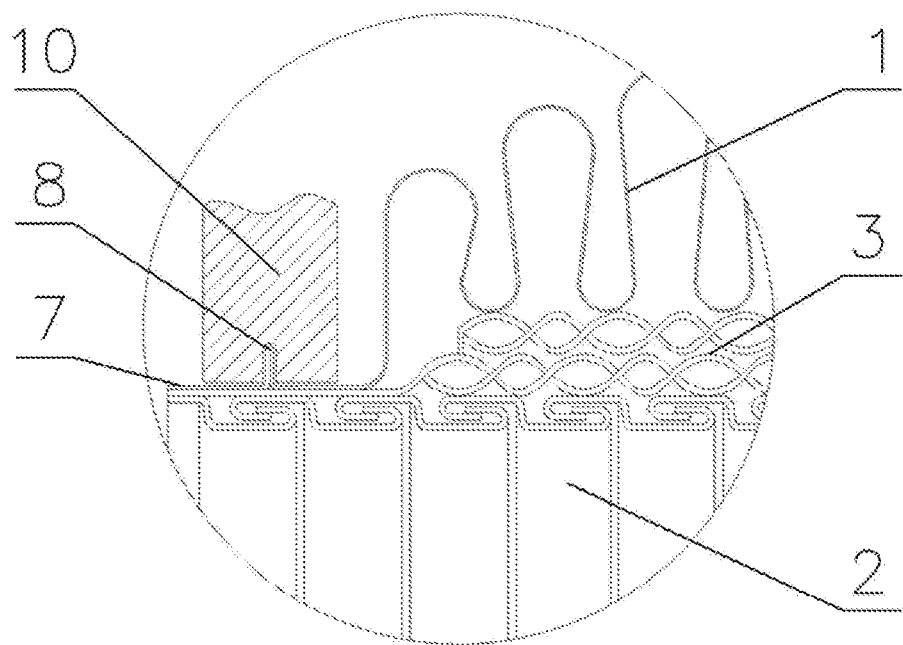
FIG. 15 is a structural schematic view showing a positional relationship between a welding positioning ring and a positioning block according to the present invention.

In this embodiment, when the flexible pipe is welded with an exhaust pipe, a positioning block 10 (see FIG. 15) is used to fix the flexible pipe by clamping the welding positioning ring, so that when the flexible pipe is welded with the exhaust pipe, a position of the flexible pipe is fixed, and no crack at the weld will occur due to sloshing, thereby obviously improving the welding quality, increasing a pass rate of the product and lowering the production cost. On the other hand, the welding positioning ring of the present invention is directly formed on the corrugated metal pipe, and the welding positioning ring has a fixed position and good uniformity, thereby reducing the welding procedure, improving the welding precision, and further achieving the object of improving the welding quality.

In addition to the above-described embodiments, the technical features or technical data of the present invention may be re-selected and combined within the scope of the claims and the disclosure of the present invention to constitute new implementations. These implementations, which are not described in detail in the present invention, can be easily implemented by those skilled in the art without any inventive effort. Therefore, these embodiments, which are not described in detail, should also be considered as specific embodiments of the present invention and are within the protection scope of the present invention.

What is claimed is:

1. A shock-absorbing flexible pipe, comprising a corrugated metal pipe and a buckle hose, wherein the buckle hose is sleeved and connected with the corrugated metal pipe, an inner knitted hose is arranged between the buckle hose and the corrugated metal pipe, and the inner knitted hose at least partially has a double-layer or_multi-layer knitted mesh structure,
wherein an outside of the inner knitted hose is provided with a partial knitted band.

2. The shock-absorbing flexible pipe according to claim 1, wherein the inner knitted hose is composed of a double-layer knitted mesh.

3. The shock-absorbing flexible pipe according to claim 2, wherein the double-layer knitted mesh is made of a complete knitted hose, a part of the complete knitted hose forms an outer knitted mesh by a folding technique, and another part of the complete knitted hose forms an inner knitted mesh.

4. The shock-absorbing flexible pipe according to claim 1, wherein the inner knitted hose is composed of a multi-layer knitted mesh.

5. The shock-absorbing flexible pipe according to claim 4, wherein the multi-layer knitted mesh is made of a complete knitted hose, and the complete knitted hose is folded over multiple times to form a multi-layer structure.

6. The shock-absorbing flexible pipe according to claim 2, wherein two adjacent layers of the double-layer knitted mesh of the inner knitted hose are connected by a knitting technique or a sewing technique.

7. The shock-absorbing flexible pipe according to claim 1, wherein the knitted band is an annular, straight-strip or spiral structure.

8. The shock-absorbing flexible pipe according to claim 1, wherein a wall thickness of at least a part of the inner knitted hose is 0.6 mm to 1.0 mm.

9. The shock-absorbing flexible pipe according to claim 1, wherein a wall thickness of at least a part of the inner knitted hose is 1.0 mm to 1.5 mm.

10. The shock-absorbing flexible pipe according to claim 1, wherein a wall thickness of at least a part of the inner knitted hose is greater than 1.5 mm.

11. The shock-absorbing flexible pipe according to claim 1, wherein a minimum clearance between at least a part of the inner knitted hose and the corrugated metal pipe is less than 1.0 mm.

12. The shock-absorbing flexible pipe according to claim 1, wherein the inner knitted hose at least partially forms an interference fit structure with the corrugated metal pipe.

13. The shock-absorbing flexible pipe according to claim 1, wherein one end of the inner knitted hose is fixed to an end portion of the shock-absorbing flexible pipe, and the other end of the inner knitted hose is a free end.

14. The shock-absorbing flexible pipe according to claim 1, wherein both ends of the inner knitted hose are respectively fixed to both ends of the shock-absorbing flexible pipe.

15. The shock-absorbing flexible pipe according to claim 1, wherein an outside of the corrugated metal pipe is provided with an outer knitted mesh.

16. The shock-absorbing flexible pipe according to claim 1, wherein an outside of the corrugated metal pipe is provided with an outer woven mesh.

17. A shock-absorbing flexible pipe, comprising a corrugated metal pipe and a buckle hose, wherein the buckle hose is sleeved and connected with the corrugated metal pipe, an inner knitted hose is arranged between the buckle hose and the corrugated metal pipe, and the inner knitted hose at least partially has a double-layer or multi-layer knitted mesh structure, wherein an outer circumference of end portions at two sides of the corrugated metal pipe is integrally and convexly provided with a welding positioning ring, and the welding positioning ring has a U-shaped cross section, and comprises an arc-shaped structure and two side edges that are integrally connected with two end portions of the arc-shaped structure.

18. The shock-absorbing flexible pipe according to claim 17, wherein the two side edges of the welding positioning ring are attached to each other, and the welding positioning ring is disposed at a middle portion of a connecting section.

19. The shock-absorbing flexible pipe according to claim 4, wherein two adjacent layers of the multi-layer knitted mesh of the inner knitted hose are connected by a knitting technique or a sewing technique.

* * * * *